United States Patent [19]

Matuo

[11] Patent Number: 5,123,096
[45] Date of Patent: Jun. 16, 1992

[54] DATA PROCESSOR WITH ADDRESSING MODE DECODING FUNCTION

[76] Inventor: Masahito Matuo, c/o ERU ESU AI Kenkyusho, Mitsubishi Denki Kabushiki Kaisha 1, Mizuhara 4-Chome, Itami-Shi, Hyogo-Ken, Japan

[21] Appl. No.: 642,169

[22] Filed: Jan. 17, 1991

Related U.S. Application Data

[63] Continuation of Ser. No. 223,491, Jul. 25, 1988, abandoned.

[30] Foreign Application Priority Data

Aug. 3, 1987 [JP] Japan .................................. 62-193955

[51] Int. Cl.⁵ .............................................. G06F 9/22
[52] U.S. Cl. .................................... 395/375; 395/425; 364/262.4; 364/262.8; 364/255.1
[58] Field of Search ... 364/200 MS File, 900 MS File, 364/200, 900

[56] References Cited

U.S. PATENT DOCUMENTS

| | | | |
|---|---|---|---|
| 3,634,883 | 1/1972 | Kreidermacher | 364/200 |
| 3,781,823 | 12/1973 | Senese | 364/200 |
| 3,900,835 | 8/1975 | Bell et al. | 364/200 |
| 3,958,221 | 5/1976 | Serra et al. | 364/200 |
| 3,990,054 | 11/1976 | Perlowski | 364/200 |
| 4,131,943 | 12/1978 | Shiraogawa | 364/200 |
| 4,197,578 | 4/1980 | Wada et al. | 364/200 |
| 4,307,445 | 12/1981 | Tredennick et al. | 364/200 |
| 4,370,729 | 1/1983 | Bosch | 364/900 X |
| 4,395,758 | 7/1983 | Helenius et al. | 364/200 |
| 4,713,750 | 12/1987 | Damouny et al. | 364/200 |
| 4,897,787 | 1/1990 | Kawasaki et al. | 364/200 |

Primary Examiner—Gareth D. Shaw
Assistant Examiner—Paul Kulik

[57] ABSTRACT

A data processor which is so constructed that an operation code decoder decodes an operation code in an instruction to be processed comprising an operation code and an operand descriptor, and an addressing mode decoder decodes the operand descriptor, so that when the addressing mode of the operand is detected to be a specified addressing mode, for example, a register direct addressing mode, an entry address of microinstruction generated by the operation code decoder is modified, thereby enabling the entry address, different in microinstruction during the specified addressing mode and others, to be generated without increasing the number of product terms of a PLA in an instruction decoder.

5 Claims, 5 Drawing Sheets

DATA PROCESSOR WITH ADDRESSING MODE DECODING FUNCTION

This is a continuation of application Ser. No. 07/223,491, filed Jul. 25, 1988, now abandoned.

BACKGROUND OF THE INVENTION

1. Field of the Invention

The present invention relates to a data processor, and more particularly to a data processor which controls execution of instructions by a microprogram.

2. Description of the Prior Art

Figure 1:
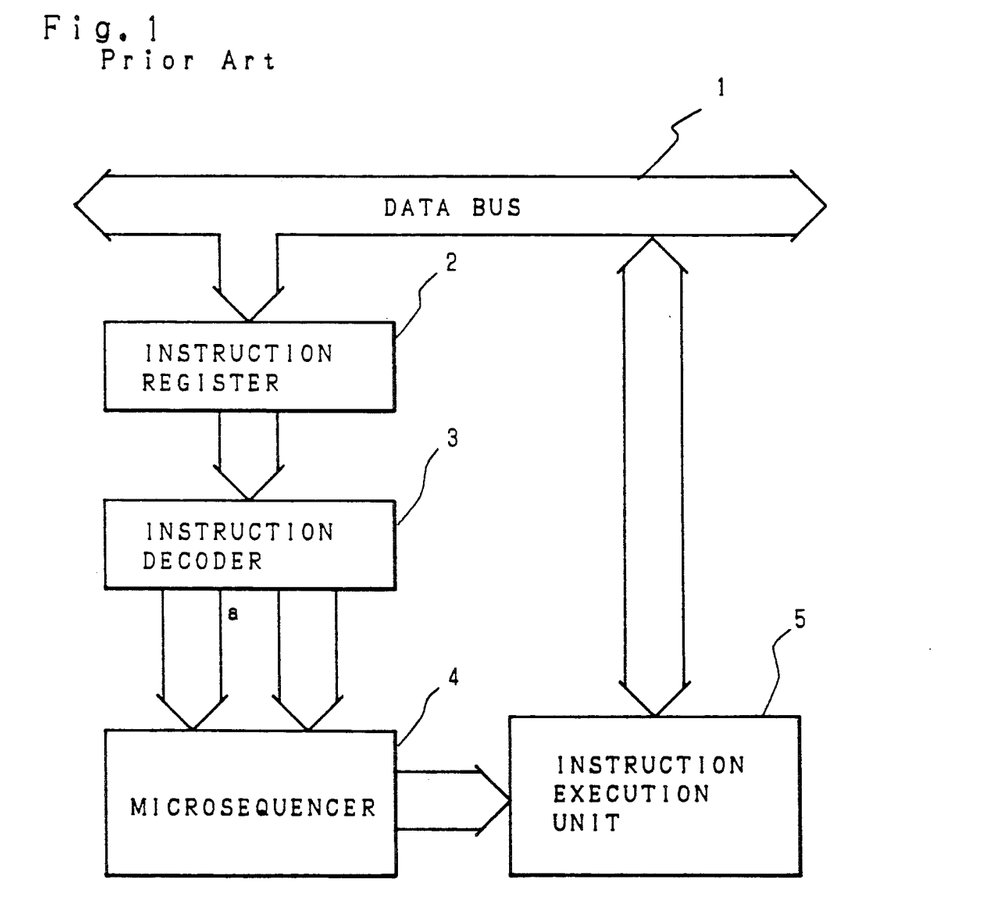
FIG. 1 is a block diagram of the principal portion of the conventional data processor for controlling execution of instructions by microprograms.

FIG. 1 is a block diagram of the principal portion of the conventional data processor which controls execution of instructions by a microprogram.

In FIG. 1, reference numeral 1 designates a data bus, which is connected to a memory means, such as a memory (not shown) storing therein the machine language instructions. Numeral 2 designates an instruction register which latches the machine language instructions fetched from the data bus 1 and numeral 3 designates an instruction decoder which decodes the machine language instructions latched in the instruction register 2. As the result of decoding of the machine language instructions, an entry address "a" of the microinstruction is produced and output to a microsequencer 4.

The microsequencer 4 reads microinstructions out of a microinstruction ROM (not shown) in accordance with the entry address output from the instruction decoder 3 and then transmits it to an instruction execution unit 5.

The instruction execution unit 5 executes the microinstruction given from the microsequencer 4.

Operation of the conventional data processor constructed as above-mentioned is as follows:

The machine language instructions are fetched from the data bus 1 to the instruction register 2 to be latched. These instructions are decoded by the instruction decoder 3 so that the entry address "a" of a microinstruction to be executed by the instruction execution unit 5 is produced and given to the microsequencer 4.

The microsequencer 4 reads out the microinstruction from the micro ROM on the basis of the entry address "a". The instruction execution unit 5 executes the instruction read from the micro ROM to execute the machine language instructions.

In addition, the instruction decoder 3 usually comprises a programmable logic array (to be hereinafter called PLA) or the like.

Figure 2A:
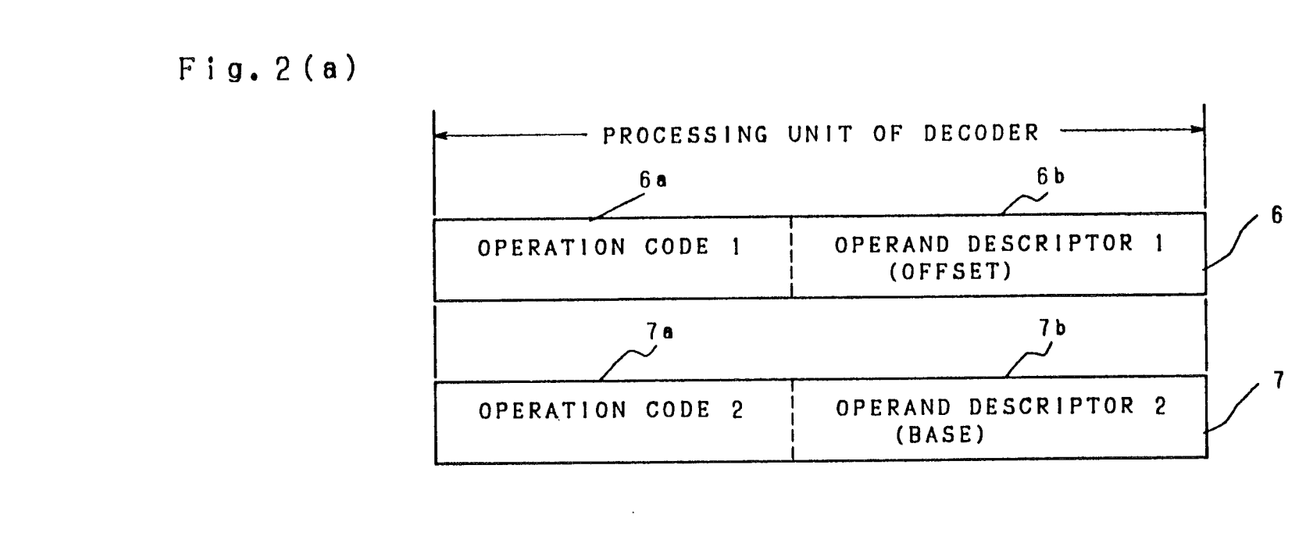
FIGS. 2(A) and 2(B) show an instruction format of machine languages and a typical view of data construction explanatory of operation of the bit set instruction.
Figure 2B:
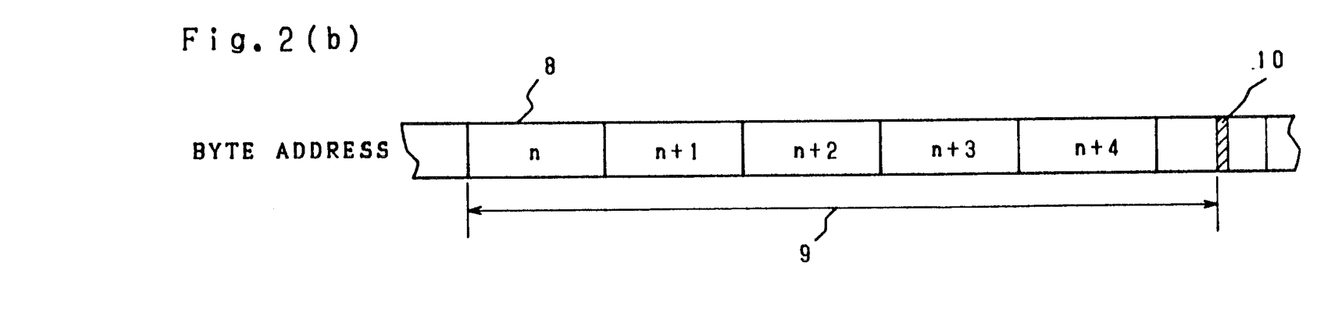

As above-mentioned, the machine language instruction is decoded to produce an entry address of the microinstruction to be executed. However, the entry address of a microinstruction may be required to be changed not only by the kind of instruction but also by the addressing modes of an operand according to the instruction set. Now, as shown in FIG. 2-(a), a case where bit set instructions 6 and 7 are decoded and executed is considered, a processing unit of instruction decoder 3 is assumed to be 16 bits in length. As shown in FIG. 2-(a), it is assumed that the bit set instructions have two addressing designation fields 6b and 7b each containing an operand descriptor. The basic portion of the instruction is described with 32 bits. For simplification of description, the extension portion of the addressing mode is omitted. The bit set instruction, as shown in FIG. 2-(b), specifies the bit position 10 of the processing object by a base address 8 and bit offset 9 therefrom and sets the bit to a logical "1". At first the machine language instruction 6 is decoded by the instruction decoder 3. The operation code 6a is decoded to produce an entry address of a microinstruction corresponding to the machine language instruction 6.

Next, a machine language instruction 7 is decoded by the instruction decoder 3. An operation code 7a is decoded to be discriminated as the bit set instruction, and at this time the addressing mode specified by the operand descriptor 7b shows the base, but the processing when the base is a register is different from the one when the same is a memory. When it is the register, the processing needs only to be executed to the specified bit in the register, but when it is a memory, it is necessary to compute byte address and bit offset of the data to be actually processed from the base address and offset. Accordingly, in this case, it is required to change the entry address of a microinstruction depending not only upon the operation code 7a but also whether the addressing mode specified by the operand descriptor 7b is a register direct mode or others.

Figures 3A, 3B:
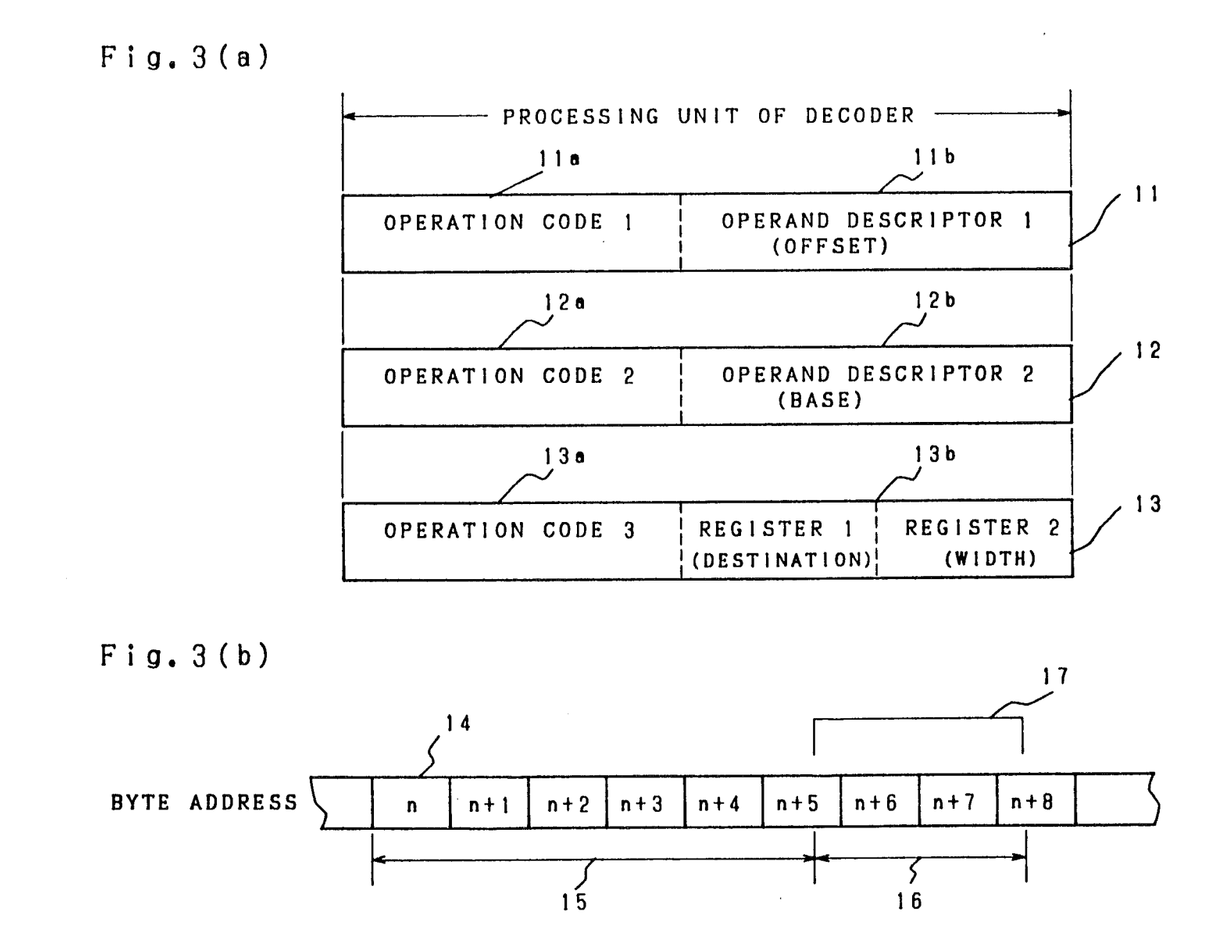
FIGS. 3(A) and 3(B) show an instruction format of machine languages and a typical view of data constitution explanatory of operation of the bit field extraction instruction.

Next, as another example, a case where bit field extraction instructions 11, 12 and 13 are executed is considered. In FIG. 3(b) the bit field extraction instruction extracts the bit field 17 shown by a bit width 16 from the bit position represented by the base 14 and offset 15 and writes it in the destination register shown by the field 13b. This instruction, as shown in FIG. 3-(a), has two addressing designation fields 11b, 12b containing the operand descriptors and is assumed to describe the basic portion of instruction by 48 bits. For simplification of explanation, the extension portion of the addressing mode is omitted. The bit field extraction instruction is executed at the point in time when the machine language instruction 13 is decoded. Also in this case the processing to be executed is different depending upon whether the operation object is for the register or the memory. In this case, it is different from the example shown in FIG. 2 in that information is required during the decoding of the machine language instruction 13 which indicates whether the operand specified by the operand descriptor 12b showing the base is register or memory. In this case, usually, it is required to feed back the result of the former instruction decoding to the input of the PLA for instruction decoding, causing the size of the PLA being large.

As above-mentioned, when the processing of an instruction depends on the addressing modes of an operand, the instruction decoder 3 of the conventional data processor is required to detect the instruction, thereby increasing the number of product terms of the PLA constituting the instruction decoder 3, thereby resulting in a large instruction decoder 3. And, in a case where the addressing mode decoding of a just preceding decoding result, such as the aforesaid bit field extraction instruction, is required for the next decoding, the number of input bits of the PLA also increases, and the decoder 3 becomes even larger.

Since the instruction decoder of the conventional data processor is constructed as above-mentioned, when it is required to change the entry address of a microinstruction due to the addressing modes of operand, the number of product terms of the PLA constituting the instruction decoder increases, thereby creating the problem in that the manufacturing cost is high when being a large scale integrated circuit.

SUMMARY OF THE INVENTION

In the light of the above problems, the present invention has been designed. A main object thereby is to provide a data processor which, even when the instruction required to change the entry address of a microinstruction by the addressing modes of an operand is processed, needs not increase the number of product terms of the PLA constituting the instruction decoder. This enables the consumption area of silicon to be reduced in a large scale integrated circuit.

The data processor of the invention is so constructed that the operation code of an instruction to be processed consisting of an operation code and an operand descriptor is decoded by an operation code decoder. The operand descriptor is decoded by an addressing mode decoder, and when the addressing mode of the operand is the specified addressing mode, for example, the register direct addressing mode, the entry address of the microinstruction produced by the operation code decoder is modified. Accordingly, the data processor of the invention can generate the entry address differently in microinstruction during the specified addressing mode and other cases without increasing the number of product terms of the instruction decoder.

The above and further objects and features of the invention will more fully be apparent from the following detailed description with accompanying drawings.

DESCRIPTION OF THE PREFERRED EMBODIMENTS

Next, the present invention will be detailed with reference to the drawings showing an embodiment thereof.

Figure 4:
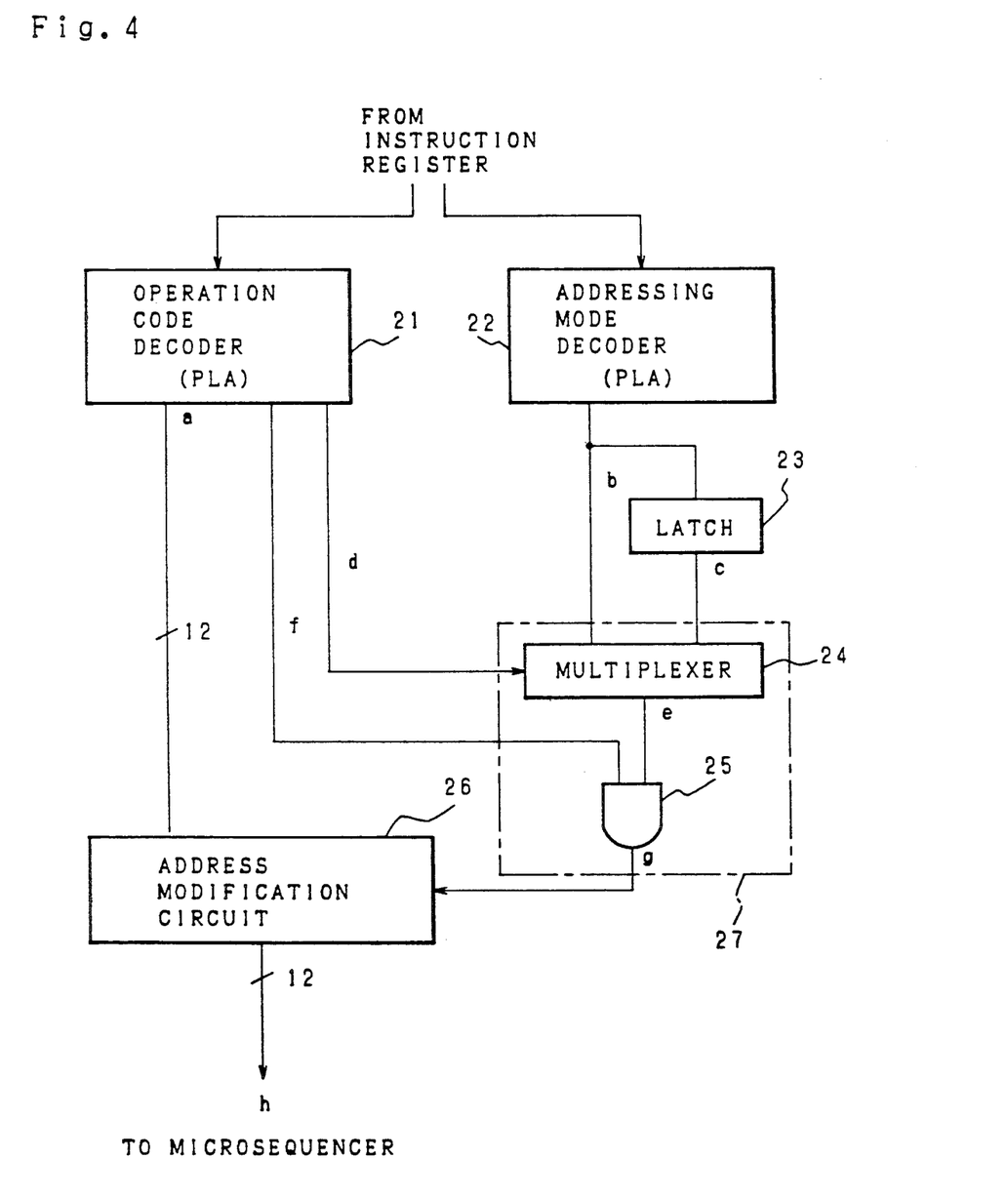
FIG. 4 is a block diagram of the principal portion of a data processor of the invention.
Figure 5:
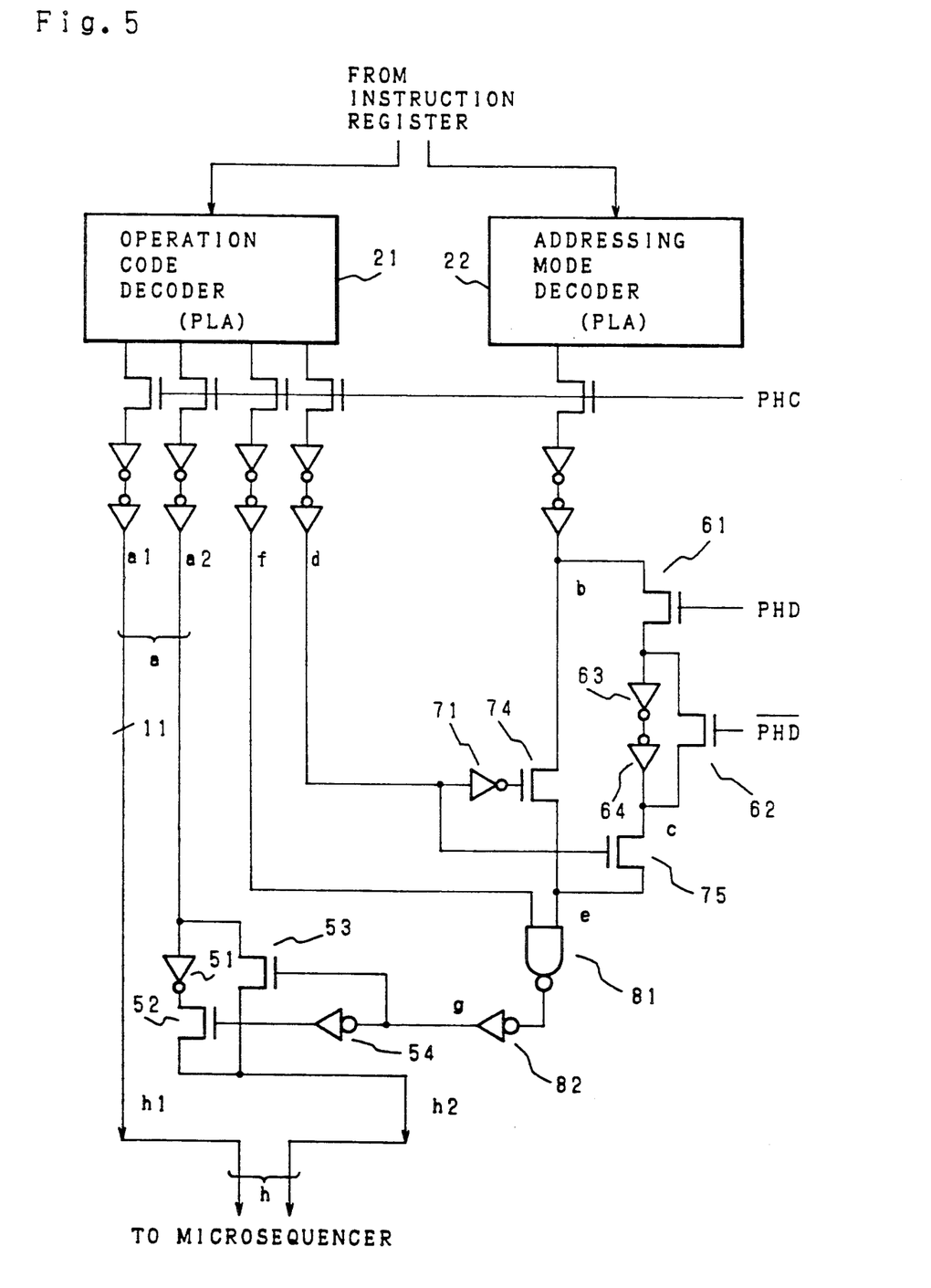
FIG. 5 is a circuit diagram showing an actual circuit thereof.

FIG. 4 is a block diagram of the principal portion of a data processor of the invention, showing a structural example of an instruction decoder, and FIG. 5 is a circuit diagram of an embodiment of the invention, showing its actual circuit, other components being the same as those in the FIG. 1 conventional example.

In FIGS. 4 and 5, reference numeral 21 designates an operation code decoder, which is given part of an operation code portion of a machine language instruction from an instruction register (not shown). The operation code is decoded to generate and output an entry address "a" of the microinstruction. In the embodiment illustrated in FIG. 4, the operation code decoder 21 comprises a PLA.

The entry address "a" output from the operation code decoder 21 is 12 bits. The higher order 11 bits are represented as a signal a1 and the lowest order bit as a2 respectively in FIG. 5.

Reference numeral 22 designates an addressing mode decoder as addressing mode detection means, which is given an operand descriptor portion of the machine language instruction from the instruction register (not shown). The part of the operand descriptor is decoded to detect the addressing mode of the operand. When the addressing mode of the present processing object is detected to be the register direct mode, the register direct mode signal b is output.

In the embodiment illustrated in FIGS. 4 and 5, the addressing mode decoder comprises a PLA.

Reference numeral 23 designates a latch, which, when a register direct mode signal b is output, stores the signal b and outputs a signal c.

The latch 23 connects a series circuit of inverters 63 and 64 in parallel to a gate element 62, the parallel circuit being connected in series to a gate element 61. The latch 23 also latches the register direct mode signal b and outputs it as the signal c.

Reference numeral 24 designates a multiplexer, which selectively inputs either the register direct mode signal b given from the addressing mode decoder 22 or the signal c given from the latch 23 and outputs it as a signal e. The selection control of the register direct mode signal b and the signal c by the multiplexer 24 is executed by a selection signal d delivered from the operation code decoder 21.

The multiplexer 24 comprises a gate element 74 given the register direct mode signal b, an inverter 71 which inverts the selection signal d output from the operation code decoder 21 and gives the inverted signal to the gate element 74 as the control signal therefor, and a gate element 75 given the signal c output from the latch 23 and given the selection signal d as the direct control signal. The outputs of both the gate elements 74 and 75 become a signal e.

Reference numeral 25 designates an AND gate for two inputs consisting of the signal e output from the multiplexer 24 and a signal f output from the operation code decoder 21. And gate 25 is required to change the entry address of a microinstruction if the addressing mode specified by the operand descriptor is a register direct mode. The AND gate 25 outputs an address modification signal g for controlling whether to execute address modification or not. The AND gate 25 comprises a NAND gate 81 into which the signals e and f are input and an inverter 82 which inverts the output of NAND gate 81 and outputs it as the address modification signal g.

In addition, the multiplexer 24 and AND gate 25 constitute address modification control means 27. address modification control means 27.

Reference numeral 26 designates an address modification circuit into which the entry address "a" output from the operation code decoder 21 is introduced. When address modifications circuit 26 is given the address modification control signal g from the AND gate 25, the address modification circuit 26 address-modifies the entry address "a" and outputs it as the last entry address h of a microinstruction.

The address modification circuit 26 is so constructed that the higher order 11 bit a1 of entry address a is output without inverting and the lowest order bit a2 is output either with or without inverting the address modification control signal g of the output of address modification control means 27. In other words, the lowest order bit a2 is given to a gate element 53 and also to a gate element 52 through an inverter 51. The gate element 53 is given the address modification control signal g directly as the control signal and the gate element 52 is given, as the control signal, the address modification control signal g inverted by an inverter 54. Accordingly, the lowest order bit a2 of the entry address is output as a signal h2 from either the gate element 52 or 53 corresponding to a value (a logical "1" or "0") of address modification control signal g. In other words, the value of the lowest order bit h2 of the entry address h lastly output to a microsequencer is either the same value or an inverted value of the lowest order bit a2 of entry address "a" output from the operation code decoder 21 depending on the value of address modification control signal g.

The following explanation pertains to the operation of the data processor of the invention provided with the instruction decoder constructed as above-mentioned.

First, taking into account a case where the bit set instruction, as shown in FIG. 2-(a), is decoded and executed in the same way as above-mentioned, a processing unit of operation code decoder 21 is assumed to be a 16 bit length. Also, it is assumed that, as shown in FIG. 2-(a), the bit set instruction has two addressing designation fields 6b and 7b containing each of the operand descriptors, and the basic portion of the instruction is described by 32 bits. To simplify this explanation, the extension portion of the addressing mode is omitted.

The bit set instruction, as shown in FIG. 2-(b), specifies the bit position 10 to be processed by the base address 8 and bit offset 9 from the address 8 and sets the bit to a logical "1". At first, an operation code 6a of a machine language instruction 6 is decoded by the operation code decoder 21. The operation code 6a is decoded to generate the entry address "a" of the microinstruction corresponding to the machine language instruction 6. Next, an operation code 7a of machine language instruction 7 is decoded by the operation code decoder 21 and the operation code 7a is decoded to be decided as the bit set instruction.

Meanwhile, an operand descriptor 7b of machine language instruction 7 is decoded by the addressing mode decoder to indicate the base, but the sequential processing differs depending upon whether the base is in the register or the memory. When in the register, the bit specified in the register needs only be processed, but when in the memory, the byte address and bit offset of data to be actually processed must be computed on the basis of the base address and offset. In this case, the entry address of a microinstruction must be changed depending upon whether the addressing mode represented by the operand descriptor 7b and the operation code 7a is the register direct mode or others. In the latter case the operation code decoder 21 generates the same entry address "a" of the microinstruction unaltered by the addressing mode. In this instruction, the information of the addressing mode during the decoding at present is required to change the entry address, whereby the operation code decoder 21 outputs a logical "0" as the selection signal d and a logical "1" as the control signal f.

In a first case, assume the addressing mode is the register direct mode. At this time the register direct mode signal b output from the addressing mode decoder 22 is a logical "1", and since the selection signal d is a logical "0", the multiplexer 24 selectively outputs a logical "1" as the register direct mode signal e. Also, since the control signal f is a logical "1", the address modification signal g is a logical "1", so that the address modification circuit 26 modifies the entry address "a" of a microinstruction generated by the operation code decoder 21. That is, the lowest order bit a2 is inverted, thereby generating the actual entry address h.

On the other hand, when the addressing mode is not the register direct mode, the register direct mode signal b becomes a logical "0" to thereby carry out no address modification. In the example shown in FIG. 5, when the same is the register direct mode, the lowest order bit a2 of the entry address "a" is inverted.

Next as another example, a considered is the case where the bit field extraction instruction shown in FIG. 3 is executed.

The bit field extraction instruction shown herewith, as shown in FIG. 3-(b), instructs that the bit field 17 shown by a bit width 16 is extracted from the bit position represented by the base 14 and offset 15 and writes the extracted bit field 17 in a destination register shown by a field 13b. This instruction, as shown in FIG. 3-(a), has two addressing designation fields 11b and 12b containing each of the operand descriptors, and the basic portion of the instruction is assumed to be described by 48 bits. To simplify this description, the extension portion of the addressing mode is omitted. Although the last instruction is executed at the point in time when the machine language instruction 13 is decoded, the processing to be carried out is different depending upon whether the operation object is the register or the memory. This differs from the example shown in FIG. 2 in that information is required as to whether the addressing mode of the base shown by the operand descriptor 12b (previous instruction cycle) during the decoding of machine language instruction 13 is the register direct mode or not.

Now, in consideration of decoding the machine language instruction 13, the operation code decoder 21 generates the same entry address "a" by the addressing mode shown by the operand descriptor 12b. This instruction is required to change the entry address by the addressing mode of the result of the former decoding, whereby the selection signal d output from the operation code decoder 21 is a logical "1" and the control signal f is a logical "1".

In consideration of a case where the addressing mode shown by the operand descriptor 12b is the register direct mode, since the register direct mode signal corresponding to the addressing mode shown by the operand descriptor 12b is stored in the latch 23, the register direct mode signal c is a logical "1" and the selection signal d is a logical "1", whereby the multiplexer 24 selectively outputs a logical "1" as the register direct mode signal e. Since the control signal f is a logical "1", the address modification control signal g is a logical "1", and the entry address "a" of microinstruction generated by the instruction decoder 21 is modified by the address modification circuit 26 to thereby generate the actual entry address h.

When the addressing mode is not the register direct mode, the register direct mode signal c becomes a logical "0" and the address modification is not carried out. In the example shown in FIG. 5, for the register direct mode, the lowest order bit a2 of the entry address "a" is inverted.

For instructions where the entry point of the microcode ROM is not dependent on the addressing mode, the control signal f is a logical "0" so that entry point modification is not performed.

As described above, in the data processor of the invention, for instructions where the entry point of the microcode ROM is dependent on the addressing mode, the control signal f is set to logical "1" and the selection signal d is set. Thus, the entry address can be modified according to the addressing mode without increasing the number of product terms in the operation code decoder PLA 21.

In addition, the above-mentioned embodiment shows that the entry address of a microinstruction is changed when in the register direct mode. Alternatively, when in a desired specified addressing mode such as a stack push mode or the like, the entry address may be changed.

As seen from the above, the present invention is so constituted that when the addressing mode of operand is the specified addressing mode as to the specified instruction, the entry address of microinstruction generated by the decoder is modified, whereby the number of input signal lines numbers of product terms can be reduced. Hence, the data processor requires a smaller consumption area of silicon when being large scale integrated and inexpensive to produce.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. In a data processor having an execution unit that processes instructions by executing a sequence of microinstructions, starting at an entry point address determined by decoding an instruction to be processed, with the processing of an instruction in the execution unit including the steps of executing an operation specified by the instruction to be processed, with an instruction to be processed including an operation code that indicates an operation to be performed and an operand specifier that specifies an addressing mode, where for a first type of instruction the entry point address is dependent on the operation code and the addressing mode specified by the operand specifier and for a second type of instruction the entry point address is dependent only on the operation code, an improved system for generating said entry point address comprising:

an operation code decoder, which receives and decodes said operation code included in a given instruction to be processed, for outputting a first entry point address and for setting n enable signal when the instruction to be processed in of said first type;

addressing mode detection means, which receives and decodes said operand specifier included in said given instruction to be processed, for providing detection information indicating whether the addressing mode specified by said operand specifier of said given instruction is a specific type of addressing mode; and entry point address modification means, coupled to said addressing mode detection means and said operation code decoder, for modifying said first entry point address output from said operation code decoder to form a modified entry point address when said specific type of addressing mode is indicated and said enable signal is set so that the microcode routine entry point address for processing the given instruction is modified according to whether said specific type of addressing mode is indicated by said given instruction.

2. A data processor as set forth in claim 1, wherein said specific type of addressing mode is a register direct mode.

3. A data processor set forth in claim 1, wherein an instruction code of said given instruction is divided into a plurality of processing units and said processing units are processed sequentially by said operation code decoder and said addressing mode detection means, said data processor further comprising:

means, coupled to said addressing mode detection means, for storing said detection information and means, controlled by the output of said operation code decoder, for selectively coupling said means for storing or an output of said addressing mode detection means to said entry point address modification means.

4. A data processor as set forth in claim 3, wherein specific type of addressing mode is a register direct addressing mode.

5. A data processor as set forth in claim 1, wherein said entry point address modification means inverts a predetermined bit(s) in said entry address output from said operation code decoder when said addressing mode of said operand specifier is said specific type of addressing mode.

* * * * *

UNITED STATES PATENT AND TRADEMARK OFFICE
CERTIFICATE OF CORRECTION

PATENT NO. : 5,123,096
DATED : June 16, 1992
INVENTOR(S) : Masahito Matsuo

It is certified that error appears in the above-indentified patent and that said Letters Patent is hereby corrected as shown below:

On the Title page, items [19] and [75], inventor should read --Matsuo--
On the Title page, item [73] Assignee should read -- MITSUBISHI DENKI KABUSHIKI KAISHA of Tokyo, Japan--
Col. 2, line 47, "being" should read --to be--.
Col. 2, line 64, insert --an-- after "of".
Col. 2, line 67, "the problem" should read --a problem--.
Col. 8, line 4, "n enable" should be --an enable--.
Col. 8, line 5, "in of" should be --is of--.

Signed and Sealed this

Twenty-first Day of December, 1993

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,123,096
DATED : June 16, 1992
INVENTOR(S) : Masahito Matsuo

It is certified that error appears in the above-identified patent and that said Letters Patent is hereby corrected as shown below:

On the Title page, items [19] and [75], Inventor should read

--Matsuo--

On the Title page, item [73] Assignee should read --MITSUBISHI DENKI KABUSHIKI KAISHA of Tokyo, Japan--
Col. 2, line 47, "being" should read --to be--
Col. 2, line 64, insert --an-- after "of"
Col. 2, line 67, "the problem" should read --a problem--
Col. 2, line 68, "a large" should read --in large--
Col. 8, line 4, "n enable" should be --an enable--
Col. 8, line 5, "in of" should be --is of--
Col. 4, line 46, "f" should be --d--
This Certificate supersedes Certificate of Correction issued Dec. 21, 1993.

Signed and Sealed this

Twenty-ninth Day of March, 1994

Attest:

BRUCE LEHMAN

Attesting Officer

Commissioner of Patents and Trademarks